US012609627B2

(12) United States Patent
Chen et al.

(10) Patent No.: US 12,609,627 B2
(45) Date of Patent: Apr. 21, 2026

(54) SERIES-PARALLEL SWITCHING CIRCUIT FOR BIDIRECTIONAL POWER CONVERSION

(71) Applicant: Shenzhen Winline Technology Co., Ltd., Shenzhen (CN)

(72) Inventors: Xiaoping Chen, Shenzhen (CN); Kaixuan Zhang, Shenzhen (CN); Haidong Zhang, Shenzhen (CN); Yanghao Chen, Shenzhen (CN); Yisai Wu, Shenzhen (CN); Yuxing Zhang, Shenzhen (CN); Jianguo Zhu, Shenzhen (CN)

(73) Assignee: Shenzhen Winline Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/307,807

(22) Filed: Aug. 22, 2025

(65) Prior Publication Data

US 2025/0392225 A1 Dec. 25, 2025

Related U.S. Application Data

(63) Continuation of application No. PCT/CN2024/121350, filed on Sep. 26, 2024.

(30) Foreign Application Priority Data

Sep. 26, 2023 (CN) .......................... 202311243896.1

(51) Int. Cl.
| | |
|---|---|
| *H02M 3/335* | (2006.01) |
| *H02J 1/08* | (2006.01) |
| *H02J 1/102* | (2026.01) |

(52) U.S. Cl.
CPC ......... *H02M 3/33584* (2013.01); *H02J 1/084* (2020.01); *H02J 1/102* (2013.01); *H02M 3/33573* (2021.05)

(58) Field of Classification Search
CPC ......... H02M 3/33584; H02M 3/33573; H02M 1/36; H02M 3/07; H02M 3/158; H02M 1/44; H02J 1/084; H02J 1/102
See application file for complete search history.

(56) References Cited

U.S. PATENT DOCUMENTS

2012/0307531 A1 12/2012 Toliyat et al.

FOREIGN PATENT DOCUMENTS

| | | |
|---|---|---|
| CN | 106981993 A | 7/2017 |
| CN | 107147324 A | 9/2017 |

(Continued)

OTHER PUBLICATIONS

CNIPA, International Search Report for International Patent Application No. PCT/CN2024/121350, Nov. 22, 2024, 5 pages.

(Continued)

*Primary Examiner* — Daniel Cavallari
(74) *Attorney, Agent, or Firm* — IP Spring

(57) ABSTRACT

A series-parallel switching circuit for bidirectional power conversion is provided. The series-parallel switching circuit includes a first bidirectional direct current (DC) voltage source and a second bidirectional DC voltage source, a first bidirectional DC/DC isolation conversion circuit and a second bidirectional DC/DC isolation conversion circuit, a series-parallel switching switch, a first output filter capacitor and a second output filter capacitor, a bleeder circuit, and a soft-start circuit. The series-parallel switching switch is configured to connect the first bidirectional DC/DC isolation conversion circuit and the second bidirectional DC/DC isolation conversion circuit in series or in parallel. When the series-parallel switching switch is switched, a voltage across the first output filter capacitor and a voltage across the second output filter capacitor are unchanged.

17 Claims, 5 Drawing Sheets

(56)          References Cited

FOREIGN PATENT DOCUMENTS

| | | | |
|---|---|---|---|
| CN | 110126658 | A | 8/2019 |
| CN | 110401361 | A | 11/2019 |
| CN | 111064359 | A | 4/2020 |
| CN | 112366950 | A | 2/2021 |
| CN | 114301271 | A | 4/2022 |
| CN | 116054590 | A | 5/2023 |
| CN | 116345920 | A | 6/2023 |

OTHER PUBLICATIONS

CNIPA, Written Opinion for International Patent Application No. PCT/CN2024/121350, Nov. 22, 2024, 8 pages.
CNIPA, Notification to Grant Patent Right for Invention for Chinese Patent Application No. 202311243896.1, Nov. 10, 2023, 13 pages.

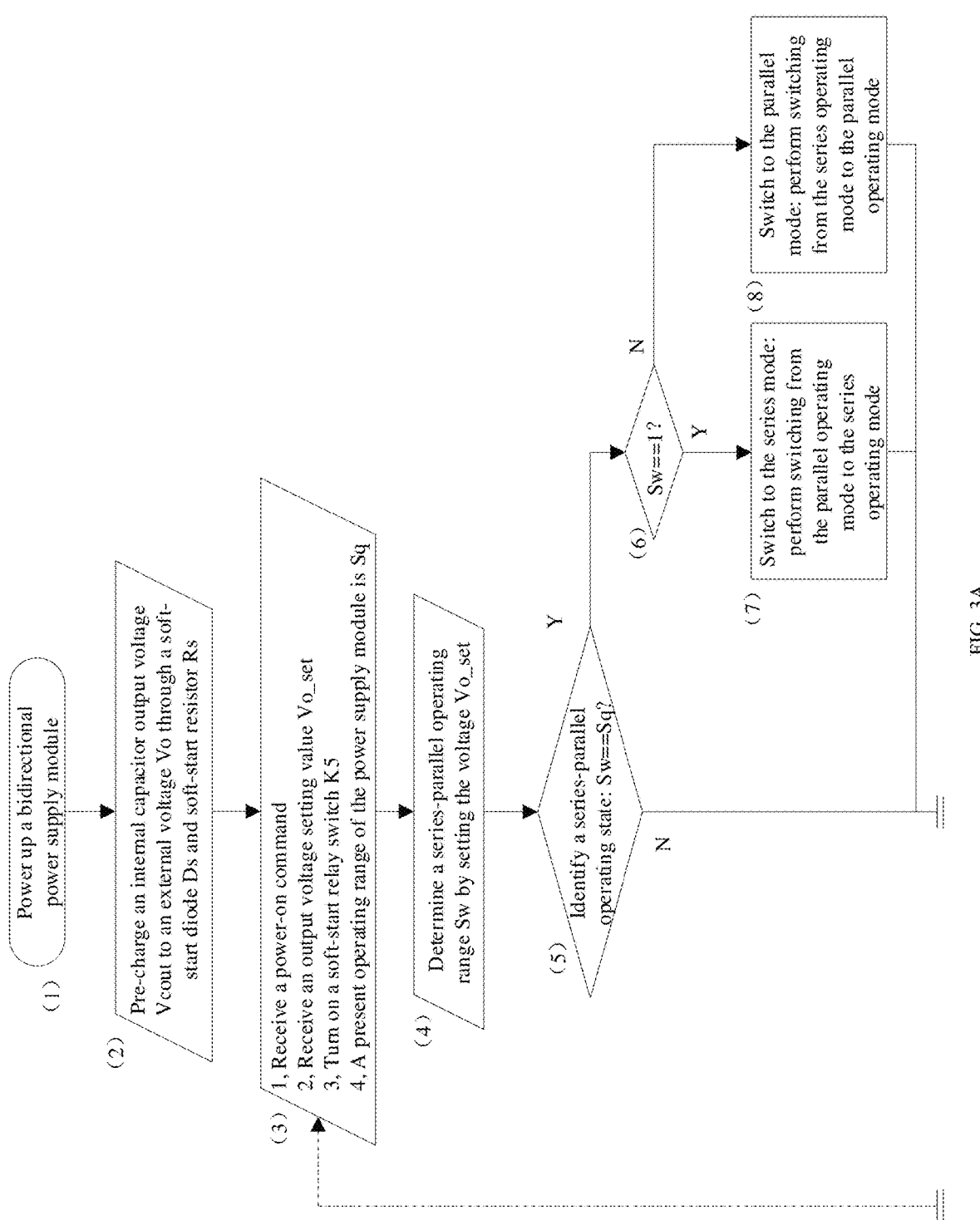

FIG. 3A (1) Power up a bidirectional power supply module (2) Pre-charge an internal capacitor output voltage Vcout to an external voltage Vo through a soft-start diode Ds and soft-start resistor Rs (3) 1, Receive a power-on command
2, Receive an output voltage setting value Vo_set
3, Turn on a soft-start relay switch K5
4, A present operating range of the power supply module is Sq (4) Determine a series-parallel operating range Sw by setting the voltage Vo_set (5) Identify a series-parallel operating state: Sw==Sq?

(6) Sw==1?

(7) Switch to the series mode: perform switching from the parallel operating mode to the series operating mode (8) Switch to the parallel mode: perform switching from the series operating mode to the parallel operating mode

SERIES-PARALLEL SWITCHING CIRCUIT FOR BIDIRECTIONAL POWER CONVERSION

CROSS-REFERENCE TO RELATED APPLICATION(S)

This application is a continuation under 35 U.S.C. § 120 of Internation Patent Application No. PCT/CN2024/121350, filed Sep. 26, 2024, which claims priority under 35 U.S.C. § 119(a) and/or PCT Article 8 to Chinese Patent Application No. 202311243896.1, filed Sep. 26, 2023. The entire disclosure of Internation Patent Application No. PCT/CN2024/121350 and Chinese Patent Application No. 202311243896.1 are hereby incorporated by reference.

TECHNICAL FIELD

This disclosure relates to the field of electric energy conversion technologies, and in particular, to a series-parallel switching circuit for bidirectional power conversion.

BACKGROUND

With rapid development of new energy industry and new battery, the form of electric energy conversion gradually shifts from traditional unidirectional flow to bidirectional flow, thereby promoting increasingly diverse application scenarios of new electric energy. An isolated direct current to direct current (DC/DC) topology for bidirectional energy flow requires a wider voltage gain conversion ratio and a higher power density, while also requiring input and output of reliable electrical isolation and higher conversion efficiency.

SUMMARY

In a first aspect, a series-parallel switching circuit for bidirectional power conversion is provided in the present disclosure. The series-parallel switching circuit for bidirectional power conversion includes a first bidirectional direct current (DC) voltage source and a second bidirectional DC voltage source, a first bidirectional DC/DC isolation conversion circuit and a second bidirectional DC/DC isolation conversion circuit, a series-parallel switching switch, a first output filter capacitor and a second output filter capacitor, a bleeder circuit, and a soft-start circuit. The first bidirectional DC voltage source and the second bidirectional DC voltage source are configured to provide a DC voltage for bidirectional power conversion. A direction from the first bidirectional DC voltage source to the second bidirectional DC voltage source is a forward power-transfer direction. The first bidirectional DC/DC isolation conversion circuit and the second bidirectional DC/DC isolation conversion circuit are configured to implement a bidirectional DC/DC function. The series-parallel switching switch is configured to connect the first bidirectional DC/DC isolation conversion circuit and the second bidirectional DC/DC isolation conversion circuit in series or in parallel, to switch the series-parallel switching circuit for bidirectional power conversion to operate in a series operating mode or a parallel operating mode. The first output filter capacitor is an output filter capacitor of the first bidirectional DC/DC isolation conversion circuit. The second output filter capacitor is an output filter capacitor of the second bidirectional DC/DC isolation conversion circuit. When the series-parallel switching switch is switched, a voltage across the first output filter capacitor and a voltage across the second output filter capacitor are unchanged. The bleeder circuit is configured to discharge the first output filter capacitor and the second output filter capacitor when the series-parallel switching circuit is powered off. The soft-start circuit includes a soft-start relay switch and a soft-start resistor. The soft-start circuit is configured for capacitive pre-charge of both the first output filter capacitor and the second output filter capacitor, to make a voltage difference between the first bidirectional DC voltage source or the second bidirectional DC voltage source and each of the first output filter capacitor and the second output filter capacitor within a preset range.

In a second aspect, an operating-mode switching method for bidirectional power conversion is provided in the present disclosure. The operating-mode switching method for bidirectional power conversion includes the following. A series-parallel switching circuit for bidirectional power conversion in the first aspect is used to switch between a series operating mode and a parallel operating mode. The series-parallel switching circuit for bidirectional power conversion includes a first DC voltage source and a second bidirectional DC voltage source, a first bidirectional DC/DC isolation conversion circuit and a second bidirectional DC/DC isolation conversion circuit, a series-parallel switching circuit, a first output filter capacitor and a second output filter capacitor, a bleeder circuit, and a soft-start circuit. The first bidirectional DC voltage source and the second bidirectional DC voltage source are configured to provide a DC voltage for bidirectional power conversion. A direction from the first bidirectional DC voltage source to the second bidirectional DC voltage source is a forward power-transfer direction. The first bidirectional DC/DC isolation conversion circuit and the second bidirectional DC/DC isolation conversion circuit are configured to implement a bidirectional DC/DC function. The series-parallel switching switch is configured to connect the first bidirectional DC/DC isolation conversion circuit and the second bidirectional DC/DC isolation conversion circuit in series or in parallel, to switch the series-parallel switching circuit for bidirectional power conversion to operate in the series operating mode or the parallel operating mode. The first output filter capacitor is an output filter capacitor of the first bidirectional DC/DC isolation conversion circuit. The second output filter capacitor is an output filter capacitor of the second bidirectional DC/DC isolation conversion circuit. When the series-parallel switching switch is switched, a voltage across the first output filter capacitor and a voltage across the second output filter capacitor are unchanged. The bleeder circuit is configured to discharge the first output filter capacitor and the second output filter capacitor when the series-parallel switching circuit is powered off. The soft-start circuit includes a soft-start relay switch and a soft-start resistor. The soft-start circuit is configured for capacitive pre-charge of both the first output filter capacitor and the second output filter capacitor, to make a voltage difference between the first bidirectional DC voltage source or the second bidirectional DC voltage source and each of the first output filter capacitor and the second output filter capacitor within a preset range.

In a third aspect, a switching power supply is provided in the present disclosure. The switching power supply includes a series-parallel switching circuit for bidirectional power conversion. The series-parallel switching circuit for bidirectional power conversion includes a first bidirectional DC voltage source and a second bidirectional DC voltage source, a first bidirectional DC/DC isolation conversion circuit and a second bidirectional DC/DC isolation conversion circuit, a series-parallel switching switch, a first output filter capacitor and a second output filter capacitor, a bleeder circuit, and a soft-start circuit. The first bidirectional DC voltage source and the second bidirectional DC voltage source are configured to provide a DC voltage for bidirectional power conversion. A direction from the first bidirectional DC voltage source to the second bidirectional DC voltage source is a forward power-transfer direction. The first bidirectional DC/DC isolation conversion circuit and the second bidirectional DC/DC isolation conversion circuit are configured to implement a bidirectional DC/DC function. The series-parallel switching switch is configured to connect the first bidirectional DC/DC isolation conversion circuit and the second bidirectional DC/DC isolation conversion circuit in series or in parallel, to switch the series-parallel switching circuit for bidirectional power conversion to operate in a series operating mode or a parallel operating mode. The first output filter capacitor is an output filter capacitor of the first bidirectional DC/DC isolation conversion circuit. The second output filter capacitor is an output filter capacitor of the second bidirectional DC/DC isolation conversion circuit. When the series-parallel switching switch is switched, a voltage across the first output filter capacitor and a voltage across the second output filter capacitor are unchanged. The bleeder circuit is configured to discharge the first output filter capacitor and the second output filter capacitor when the series-parallel switching circuit is powered off. The soft-start circuit includes a soft-start relay switch and a soft-start resistor. The soft-start circuit is configured for capacitive pre-charge of both the first output filter capacitor and the second output filter capacitor, to make a voltage difference between the first bidirectional DC voltage source or the second bidirectional DC voltage source and each of the first output filter capacitor and the second output filter capacitor within a preset range.

BRIEF DESCRIPTION OF THE DRAWINGS

To more clearly describe technical solutions in embodiments of the present disclosure, the accompanying drawings that need to be used in the embodiments will be briefly introduced below. Apparently, the accompanying drawings in the following description are only some embodiments of the present disclosure, and those of ordinary skill in the art may also obtain other accompanying drawings based on these accompanying drawings without creative effort.

FIGS. 3A-3B show a schematic flowchart of a corresponding control method of a series-parallel switching circuit for bidirectional power conversion according to an embodiment of the present disclosure.

DETAILED DESCRIPTION

Figure 1:
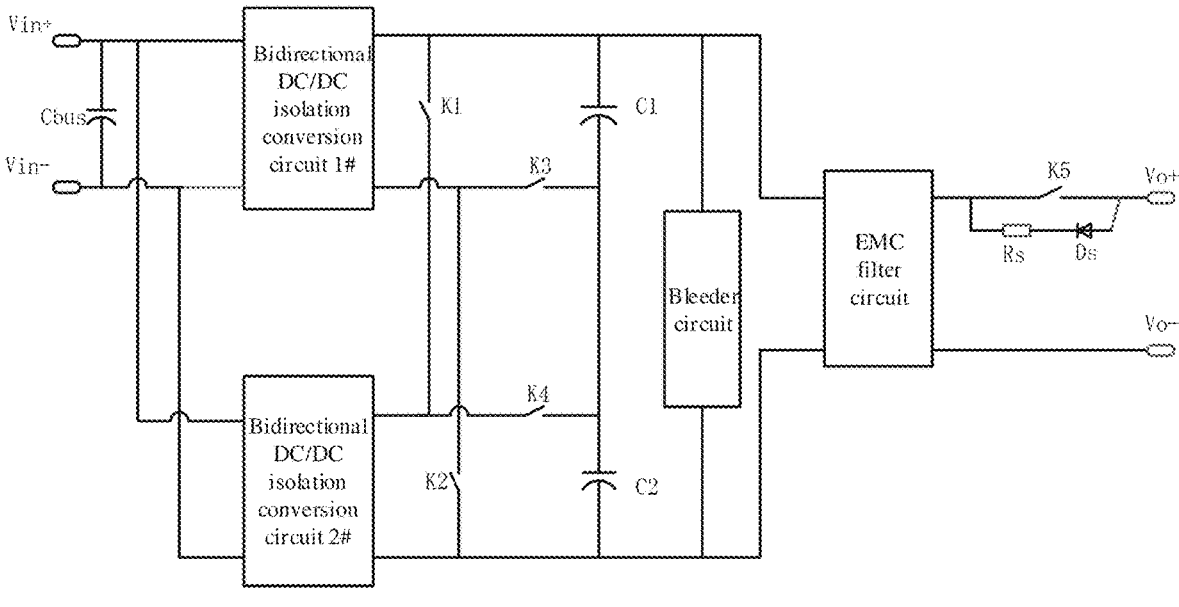
FIG. 1 is a schematic diagram of a series-parallel switching circuit for bidirectional power conversion according to an embodiment of the present disclosure.

To better understand the technical solutions of the present disclosure, the following describes embodiments of the present disclosure in detail with reference to the accompanying drawings.

It should be clear that the described embodiments are merely some rather than all of embodiments of the present disclosure. All other embodiments obtained by those of ordinary skill in the art based on embodiments of the present disclosure without creative efforts shall fall within the protection scope of the present disclosure.

The terms used in the embodiments of the present disclosure are for the purpose of describing particular embodiments only and are not intended to be limiting of the present disclosure. As used in the embodiments of the present disclosure and the appended claims, the singular forms "a", "an", and "the" are intended to include plural forms as well, unless the context clearly indicates otherwise.

It is understood that, the term "and/or" referred to herein only describes an association relationship between associated objects, which indicates that there can be three relationships, for example, A and/or B can indicate A alone, both A and B, or B alone. In addition, the character "/" referred to herein generally indicates that the associated objects are in an "or" relationship.

It is understood that, although terms such as "first", "second", and "third" may be used in the embodiments of the present disclosure to describe a preset range, the preset range should not be limited to these terms. These terms are only used to distinguish the preset ranges from each other. For example, the first preset range may also be referred to as a second preset range, and similarly, the second preset range may also be referred to as the first preset range, without departing from the scope of the embodiments of the present disclosure.

Depending on the context, the word "if" referred to herein may be construed as "when", "during", "in response to determining", or "in response to detecting". Similarly, depending on the context, phrases such as "if it is determined" or "if (a stated condition or event) is detected" may be construed as "upon determining", "in response to determining", "upon detecting (a stated condition or event)", or "in response to detecting (a stated condition or event)".

At present, to implement a processing capability of a wide output voltage range of a bidirectional direct current to direct current (DC/DC) conversion circuit, series-parallel conversion design is generally performed on two bidirectional DC/DCs. A bidirectional DC/DC conversion topology generally adopts a dual active bridge circuit or a bidirectional inductor-inductor-capacitor (LLC) circuit. The dual active bridge circuit and the bidirectional LLC circuit belong to current source conversion topologies. When a current source conversion circuit performs serial-parallel conversion, an output circuit needs to be completely disconnected from the outside, an output capacitor voltage is discharged to 0 V through a bleeder circuit, and then serial-parallel switching and a pre-charging soft-start operation are performed. This solution cannot realize fast switching of series-parallel switching.

In light of this, the present disclosure provides a series-parallel switching circuit for bidirectional power conversion, to solve a problem that fast switching of series-parallel switching cannot be realized.

In a first aspect, a series-parallel switching circuit for bidirectional power conversion is provided in the present disclosure. The series-parallel switching circuit for bidirectional power conversion includes a first bidirectional direct current (DC) voltage source and a second bidirectional DC voltage source, a first bidirectional DC/DC isolation conversion circuit and a second bidirectional DC/DC isolation conversion circuit, a series-parallel switching switch, a first output filter capacitor and a second output filter capacitor, a bleeder circuit, and a soft-start circuit. The first bidirectional DC voltage source and the second bidirectional DC voltage source are configured to provide a DC voltage for bidirectional power conversion. A direction from the first bidirectional DC voltage source to the second bidirectional DC voltage source is a forward power-transfer direction. The first bidirectional DC/DC isolation conversion circuit and the second bidirectional DC/DC isolation conversion circuit are configured to implement a bidirectional DC/DC function. The series-parallel switching switch is configured to connect the first bidirectional DC/DC isolation conversion circuit and the second bidirectional DC/DC isolation conversion circuit in series or in parallel, to switch the series-parallel switching circuit for bidirectional power conversion to operate in a series operating mode or a parallel operating mode. The first output filter capacitor is an output filter capacitor of the first bidirectional DC/DC isolation conversion circuit. The second output filter capacitor is an output filter capacitor of the second bidirectional DC/DC isolation conversion circuit. When the series-parallel switching switch is switched, a voltage across the first output filter capacitor and a voltage across the second output filter capacitor are unchanged. The bleeder circuit is configured to discharge the first output filter capacitor and the second output filter capacitor when the series-parallel switching circuit is powered off. The soft-start circuit includes a soft-start relay switch and a soft-start resistor. The soft-start circuit is configured for capacitive pre-charge of both the first output filter capacitor and the second output filter capacitor, to make a voltage difference between the first bidirectional DC voltage source or the second bidirectional DC voltage source and each of the first output filter capacitor and the second output filter capacitor within a preset range.

With reference to the aspect and any possible implementation manner mentioned above, an implementation manner is further provided. The series-parallel switching switch includes a first switch, a second switch, a third switch, and a fourth switch. When the first switch and the second switch are turned on, and the third switch and the fourth switch are turned off, the series-parallel switching circuit for bidirectional power conversion is switched to the parallel operating mode. When the first switch and the second switch are turned off, and the third switch and the fourth switch are turned on, the series-parallel switching circuit for bidirectional power conversion is switched to the series operating mode. A path of the series-parallel switching switch does not contain the first output filter capacitor and/or the second output filter capacitor. One end of the first output filter capacitor is connected to a positive electrode of each of the first bidirectional DC voltage source and the second bidirectional DC voltage source. One end of the second output filter capacitor is connected to a negative electrode of each of the first bidirectional DC voltage source and the second bidirectional DC voltage source. Another end of the first output filter capacitor is connected to another end of the second output filter capacitor.

With reference to the aspect and any possible implementation manner mentioned above, an implementation manner is further provided. When the series-parallel switching circuit for bidirectional power conversion is powered up in the forward power-transfer direction, the soft-start relay switch is turned off, and then the first bidirectional DC voltage source or the second bidirectional DC voltage source charges an internal voltage through the soft-start resistor. The internal voltage includes the voltage across the first output filter capacitor and the voltage across the second output filter capacitor. When a voltage difference across the soft-start relay switch reaches a preset threshold, the soft-start relay switch is turned on to complete a pre-charge operation.

With reference to the aspect and any possible implementation manner mentioned above, an implementation manner is further provided. When the series-parallel switching circuit for bidirectional power conversion is powered off, the first bidirectional DC/DC isolation conversion circuit and the second bidirectional DC/DC isolation conversion circuit stop power transfer, and then the soft-start relay switch is turned off and an output voltage is obtained. When the output voltage drops to a preset safe voltage range, the bleeder circuit is started to discharge the internal voltage to implement a bleeder function.

With reference to the aspect and any possible implementation manner mentioned above, an implementation manner is further provided. When the series-parallel switching circuit for bidirectional power conversion is switched from the series operating mode to the parallel operating mode, the first bidirectional DC/DC isolation conversion circuit and the second bidirectional DC/DC isolation conversion circuit stop power transfer, and then a delay operation is performed according to the parallel operating mode switched by the series-parallel switching switch. After the delay operation ends, a power transfer function of the first bidirectional DC/DC isolation conversion circuit and the second bidirectional DC/DC isolation conversion circuit is started to complete switching of the parallel operating mode.

With reference to the aspect and any possible implementation manner mentioned above, an implementation manner is further provided. In terms of performing the delay operation according to the parallel operating mode switched by the series-parallel switching switch, a first time is delayed after the first bidirectional DC/DC isolation conversion circuit and the second bidirectional DC/DC isolation conversion circuit stop the power transfer, the first switch and the second switch are turned off and a second time is delayed after delaying the first time, the third switch and the fourth switch are turned on and a third time is delayed after delaying the second time, and after delaying the third time, the power transfer function of the first bidirectional DC/DC isolation conversion circuit and the second bidirectional DC/DC isolation conversion circuit is started to complete the switching of the parallel operating mode. The first time is set according to a current freewheeling time. The second time is set according to a delay time of a turn-off operation of the soft-start relay switch. The third time is set according to a delay time of a turn-on operation of the soft-start relay switch.

With reference to the aspect and any possible implementation manner mentioned above, an implementation manner is further provided. When the series-parallel switching circuit for bidirectional power conversion is switched from the parallel operating mode to the series operating mode, the first bidirectional DC/DC isolation conversion circuit and the second bidirectional DC/DC isolation conversion circuit stop power transfer, and then a delay operation is performed according to the series operating mode switched by the series-parallel switching switch; and after the delay operation ends, a power transfer function of the first bidirectional DC/DC isolation conversion circuit and the second bidirectional DC/DC isolation conversion circuit is started to complete switching of the series operating mode.

With reference to the aspect and any possible implementation manner mentioned above, an implementation manner is further provided. In terms of performing the delay operation according to the series-connected operating mode switched by the series-parallel switching switch, a first time is delayed after the first bidirectional DC/DC isolation conversion circuit and the second bidirectional DC/DC isolation conversion circuit stop power transfer, the third switch and the fourth switch are turned off and a second time is delayed after delaying the first time, the first switch and the second switch are turned on and a third time is delayed after delaying the second time, and after delaying the third time, the power transfer function of the first bidirectional DC/DC isolation conversion circuit and the second bidirectional DC/DC isolation conversion circuit is started to complete the switching of the series operating mode. The first time is set according to a current freewheeling time. The second time is set according to a delay time of a turn-off operation of the soft-start relay switch. The third time is set according to a delay time of a turn-on operation of the soft-start relay switch.

In a second aspect, an operating-mode switching method for bidirectional power conversion is provided in the present disclosure. The operating-mode switching method for bidirectional power conversion includes the following. The series-parallel switching circuit for bidirectional power conversion in the first aspect is used to switch between the series operating mode and the parallel operating mode.

In a third aspect, a switching power supply is provided in the present disclosure. The switching power supply includes the series-parallel switching circuit for bidirectional power conversion in the first aspect.

In the present disclosure, by providing two bidirectional DC/DC isolation conversion circuits and corresponding output filter capacitors, and by maintaining the voltage across each output filter capacitor of the two bidirectional DC/DC isolation conversion circuits unchanged in the series-parallel switching process, decoupling processing between serial-parallel switching of the two bidirectional DC/DC isolation conversion circuits and the corresponding output filter capacitors, the sticking risk of voltage difference switching across the soft-start relay is eliminated, and an electric energy bleeder function and a soft-start pre-charge function are supported in the series-parallel switching process of two bidirectional DC/DC isolation conversion circuits. The present disclosure can greatly reduce the time for series-parallel switching of the bidirectional DC/DC isolation conversion circuit, can implement a fast series-parallel switching function of the bidirectional DC/DC isolation conversion circuit, and can greatly improve the applicability of the bidirectional DC/DC isolation conversion circuit.

The present disclosure provides a series-parallel switching circuit for bidirectional power conversion. The series-parallel switching circuit for bidirectional power conversion includes a first bidirectional DC voltage source and a second bidirectional DC voltage source. The first bidirectional DC voltage source and the second bidirectional DC voltage source are configured to provide a DC voltage for bidirectional power conversion. A direction from the first bidirectional DC voltage source to the second bidirectional DC voltage source is a forward power-transfer direction.

The bidirectional power supports power transfer in a forward direction and power transfer in a reverse direction. A DC voltage source may be provided in each of the forward direction and the reverse direction. Specifically, in embodiments of the present disclosure, an electric energy direction from the first bidirectional DC voltage source to the second bidirectional DC voltage source is defined as a forward direction, and the description is based on this.

The series-parallel switching circuit for bidirectional power conversion further includes a first bidirectional DC/DC isolation conversion circuit and a second bidirectional DC/DC isolation conversion circuit. The first bidirectional DC/DC isolation conversion circuit and the second bidirectional DC/DC isolation conversion circuit are configured to implement a bidirectional DC/DC function.

In an embodiment, core components for implementing bidirectional power conversion in the series-parallel switching circuit for bidirectional power conversion are a first bidirectional DC/DC isolation conversion circuit and a second bidirectional DC/DC isolation conversion circuit. The first bidirectional DC/DC isolation conversion circuit and the second bidirectional DC/DC isolation conversion circuit can specifically implement wide-range bidirectional voltage output by means of series-parallel switching, so that an output range of the output voltage is wider.

The series-parallel switching circuit for bidirectional power conversion further includes a series-parallel switching switch. The series-parallel switching switch is configured to connect the first bidirectional DC/DC isolation conversion circuit and the second bidirectional DC/DC isolation conversion circuit in series or in parallel, to switch the series-parallel switching circuit for bidirectional power conversion to operate in a series operating mode or a parallel operating mode.

In an embodiment, to implement the series-parallel switching function for bidirectional power conversion, the series-parallel switching switch may be specifically provided. The series-parallel switching switch includes two switching modes: one mode sets the first bidirectional DC/DC isolation conversion circuit and the second bidirectional DC/DC isolation conversion circuit in a series relationship, in which case the circuit is switched to the series operating mode, and an upper limit of the voltage output value in the series operating mode may be higher; the other mode is to set the first bidirectional DC/DC isolation conversion circuit and the second bidirectional DC/DC isolation conversion circuit in a parallel relationship, in which case the circuit is switched to the parallel operating mode, and a lower limit of a voltage output value in the parallel operating mode may be lower.

The series-parallel switching circuit for bidirectional power conversion further includes a first output filter capacitor and a second output filter capacitor. The first output filter capacitor is an output filter capacitor of the first bidirectional DC/DC isolation conversion circuit. The second output filter capacitor is an output filter capacitor of the second bidirectional DC/DC isolation conversion circuit. When the series-parallel switching switch is switched, a voltage across the first output filter capacitor and a voltage across the second output filter capacitor are unchanged.

In an embodiment, power conversion in the circuit is accompanied by a filtering requirement. In the present disclosure, the first output filter capacitor and the second output filter capacitor are specifically provided. The first output filter capacitor is specifically provided for the first bidirectional DC/DC isolation conversion circuit, and second output filter capacitor is specifically provided for the second bidirectional DC/DC isolation conversion circuit, so that the filter operation is performed on the output current. It may be noted that, the present disclosure particularly decouples the first output filter capacitor and the second output filter capacitor from the series-parallel switching switch, so that the voltage across each of the first output filter capacitor and the second output filter capacitor is not affected during switching of the series-parallel switching switch. This approach can avoid the problem of an excessively large instantaneous voltage difference between the voltage across each of the first output filter capacitor and the second output filter capacitor and the external voltage (i.e., the voltage of the first bidirectional DC voltage source or the voltage of the second bidirectional DC voltage source). Therefore, it is not necessary to completely disconnect the internal and external (DC voltage source) of the circuit, and fast switching of series-parallel switching can be implemented without any waiting throughout the entire process.

The series-parallel switching circuit for bidirectional power conversion further includes a bleeder circuit. The bleeder circuit is configured to discharge the first output filter capacitor and the second output filter capacitor when the series-parallel switching circuit is powered off.

In an embodiment, when the series-parallel switching circuit for bidirectional power conversion is powered off or when the power supply is unplugged while online, for example, upon receiving a power-off command or identifying a power-supply unplug signal, the first output filter capacitor and the second output filter capacitor can be discharged through the bleeder circuit, so as to discharge each of the first output filter capacitor and the second output filter capacitor to a safe voltage, thereby effectively protecting the circuit.

The series-parallel switching circuit for bidirectional power conversion further includes a soft-start circuit. The soft-start circuit includes a soft-start relay switch and a soft-start resistor. The soft-start circuit is configured for capacitive pre-charge of both the first output filter capacitor and the second output filter capacitor, to make a voltage difference between the first bidirectional DC voltage source or the second bidirectional DC voltage source and each of the first output filter capacitor and the second output filter capacitor within a preset range.

In an embodiment, the soft-start circuit provided in the present disclosure is applied prior to bidirectional power conversion, and is associated with decoupled configuration of the series-parallel switching switch, the first output filter capacitor, and the second output filter capacitor. Specifically, the soft-start circuit performs capacitive pre-charge on the first output filter capacitor and the second output filter capacitor before bidirectional power conversion, and makes the voltage across each of the first output filter capacitor and the second output filter capacitor equal to or close to the voltage of the bidirectional DC voltage source. In this way, given the above-mentioned decoupled configuration of the series-parallel switching switch, the first output filter capacitor, and the second output filter capacitor, and since the voltage across each of the first output filter capacitor and the second output filter capacitor is not affected during switching of the series-parallel switching switch, the voltage across each of the first output filter capacitor and the second output filter capacitor maintains within a safe range relative to the external voltage, and the switching of the series-parallel switching switch does not require the circuit to be disconnected for a discharge operation. The present disclosure enables seamless switching between the series operating mode and the parallel operating mode on the premise of circuit security, thereby significantly improving the applicability of the series-parallel switching circuit for bidirectional power conversion.

Further, the series-parallel switching switch includes a first switch, a second switch, a third switch, and a fourth switch. When the first switch and the second switch are turned on, and the third switch and the fourth switch are turned off, the series-parallel switching circuit for bidirectional power conversion is switched to the parallel operating mode. When the first switch and the second switch are turned off, and the third switch and the fourth switch are turned on, the series-parallel switching circuit for bidirectional power conversion is switched to the series operating mode. A path of the series-parallel switching switch does not contain the first output filter capacitor and/or the second output filter capacitor. One end of the first output filter capacitor is connected to a positive electrode of each of the first bidirectional DC voltage source and the second bidirectional DC voltage source. One end of the second output filter capacitor is connected to a negative electrode of each of the first bidirectional DC voltage source and the second bidirectional DC voltage source. Another end of the first output filter capacitor is connected to another end of the second output filter capacitor.

Further, when the series-parallel switching circuit for bidirectional power conversion is powered up in the forward power-transfer direction, the soft-start relay switch is turned off, and then the first bidirectional DC voltage source or the second bidirectional DC voltage source charges an internal voltage through the soft-start resistor. The internal voltage includes the voltage across the first output filter capacitor and the voltage across the second output filter capacitor. When a voltage difference across the soft-start relay switch reaches a preset threshold, the soft-start relay switch is turned on to complete a pre-charge operation.

Further, when the series-parallel switching circuit for bidirectional power conversion is switched from the series operating mode to the parallel operating mode, the first bidirectional DC/DC isolation conversion circuit and the second bidirectional DC/DC isolation conversion circuit stop power transfer, and then a delay operation is performed according to the parallel operating mode switched by the series-parallel switching switch. After the delay operation ends, a power transfer function of the first bidirectional DC/DC isolation conversion circuit and the second bidirectional DC/DC isolation conversion circuit is started to complete switching of the parallel operating mode.

Further, in terms of performing the delay operation according to the parallel operating mode switched by the series-parallel switching switch, a first time is delayed after the first bidirectional DC/DC isolation conversion circuit and the second bidirectional DC/DC isolation conversion circuit stop the power transfer, the first switch and the second switch are turned off and a second time is delayed after delaying the first time, the third switch and the fourth switch are turned on and a third time is delayed after delaying the second time, and after delaying the third time, the power transfer function of the first bidirectional DC/DC isolation conversion circuit and the second bidirectional DC/DC isolation conversion circuit is started to complete the switching of the parallel operating mode. The first time is set according to a current freewheeling time. The second time is set according to a delay time of a turn-off operation of the soft-start relay switch. The third time is set according to a delay time of a turn-on operation of the soft-start relay switch.

Further, when the series-parallel switching circuit for bidirectional power conversion is switched from the parallel operating mode to the series operating mode, the first bidirectional DC/DC isolation conversion circuit and the second bidirectional DC/DC isolation conversion circuit stop power transfer, and then a delay operation is performed according to the series operating mode switched by the series-parallel switching switch; and after the delay operation ends, a power transfer function of the first bidirectional DC/DC isolation conversion circuit and the second bidirectional DC/DC isolation conversion circuit is started to complete switching of the series operating mode.

Further, in terms of performing the delay operation according to the series-connected operating mode switched by the series-parallel switching switch, a first time is delayed after the first bidirectional DC/DC isolation conversion circuit and the second bidirectional DC/DC isolation conversion circuit stop power transfer, the third switch and the fourth switch are turned off and a second time is delayed after delaying the first time, the first switch and the second switch are turned on and a third time is delayed after delaying the second time, and after delaying the third time, the power transfer function of the first bidirectional DC/DC isolation conversion circuit and the second bidirectional DC/DC isolation conversion circuit is started to complete the switching of the series operating mode. The first time is set according to a current freewheeling time. The second time is set according to a delay time of a turn-off operation of the soft-start relay switch. The third time is set according to a delay time of a turn-on operation of the soft-start relay switch.

Further, when the series-parallel switching circuit for bidirectional power conversion is powered off, the first bidirectional DC/DC isolation conversion circuit and the second bidirectional DC/DC isolation conversion circuit stop power transfer, and then the soft-start relay switch is turned off and an output voltage is obtained. When the output voltage drops to a preset safe voltage range, the bleeder circuit is started to discharge the internal voltage to implement a bleeder function.

The solutions and more implementation manners of the present disclosure are described in the following with reference to the accompanying drawings.

FIG. 1 is a schematic diagram of a series-parallel switching circuit for bidirectional power conversion according to an embodiment of the present disclosure. As illustrated in FIG. 1, the series-parallel switching circuit for bidirectional power conversion includes two (upper and lower) bidirectional DC/DC isolation conversion circuits, namely a bidirectional DC/DC isolation conversion circuit 1# and a bidirectional DC/DC isolation conversion circuit 2#.

Specifically, a direction from Vin to Vo (i.e., Vin→Vo) may be defined as a forward power-transfer direction. Vin is a bidirectional DC input voltage source. Vo is a bidirectional DC output voltage source. K1, K2, K3, and K4 cooperate to serve as a series-parallel switching switch. C1 is an upper-path output filter capacitor. C2 is a lower-path output filter capacitor. Cbus is an input filter capacitor. K5 is a soft-start relay switch. Rs is a soft-start resistor. Ds is a soft-start diode. At the output side, a bleeder circuit and an electromagnetic compatibility (EMC) filter circuit are included.

Further, based on FIG. 1, to provide a more detailed explanation of an implementation manner and a related control method of the series-parallel switching circuit for bidirectional power conversion in the present disclosure, the description is specifically provided by taking the series-parallel configuration of dual active bridge circuits as an example.

Figure 2:
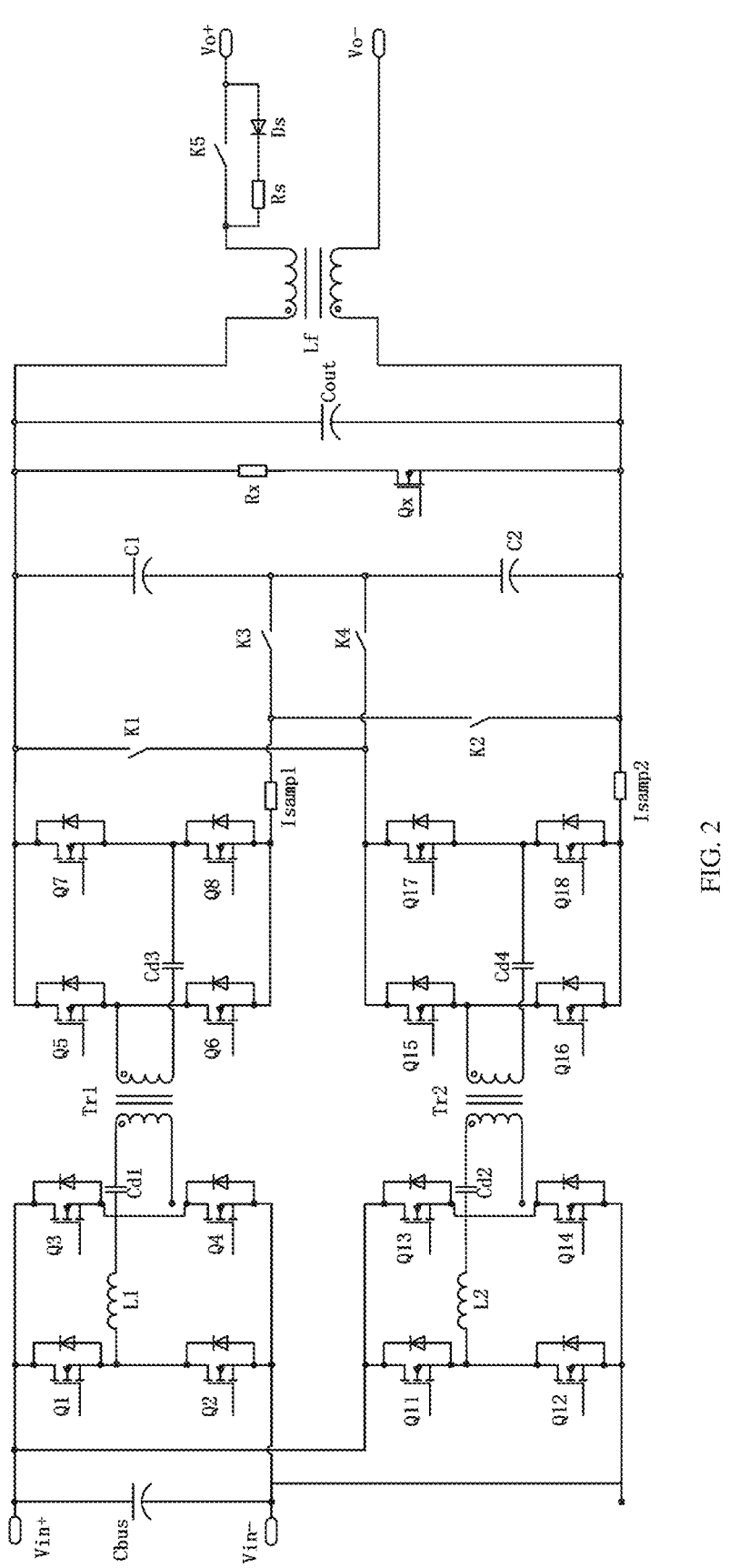
FIG. 2 is a schematic diagram of a dual active bridge series-parallel switching circuit for bidirectional power conversion according to an embodiment of the present disclosure.

FIG. 2 is a schematic diagram of a dual active bridge series-parallel switching circuit for bidirectional power conversion according to an embodiment of the present disclosure. As illustrated in FIG. 2, Vin is a forward DC input voltage. Vo is a forward DC output voltage. Cbus is an input filter capacitor. C1 is an upper-path output filter capacitor. C2 is a lower-path output filter capacitor. Cout is an output full-bus capacitor. Q1, Q2, Q3, and Q4 are primary-side active switching transistors of an upper-path dual active bridge. Q5, Q6, Q7, and Q8 are secondary-side active switching transistors of the upper-path dual active bridge. L1 is an upper-path resonant inductor. Cd1 is an upper-path primary-side blocking capacitor. Cd3 is upper-path secondary-side blocking capacitor. Tr1 is an upper-path main transformer. Q11, Q12, Q13, and Q14 are primary-side active switching transistors of a lower-path dual active bridge. Q15, Q16, Q17, and Q18 are secondary-side active switching transistors of the lower-path dual active bridge. L2 is a lower-path resonant inductor. Cd2 is a lower-path primary-side blocking capacitor. Cd4 is lower-path secondary-side blocking capacitor. Tr2 is a lower-path main transformer. K1, K2, K3, and K4 are series-parallel switching switches. Rx is a bleeder resistor. Qx is a bleeder switching transistor. Lf is a common-mode filter inductor. K5 is a soft-start relay switch. Rs is a soft-start resistor. Ds is a soft-start diode. Isamp1 is an upper-path current sampling resistor. Isamp2 is a lower-path current sampling resistor.

Taking FIG. 2 as an example for description, when the bidirectional circuit is powered up in the forward power-transfer direction, the soft-start relay switch K5 is in an off state, the voltage across each of the output capacitor Cout, the upper-path output filter capacitor C1, and the lower-path output filter capacitor C2 is 0 V. At this time, the external voltage Vin charges the internal output capacitor Cout, the upper-path output filter capacitor C1, and the lower-path output filter capacitor C2 in the circuit through the soft-start resistor Rs. When the internal voltage is pre-charged to approach Vin, the voltage difference across the soft-start relay switch K5 approaches 0 V, and then the soft-start relay switch K5 is turned on to complete the pre-charge operation.

Taking FIG. 2 as an example for description, when the series-parallel switching circuit for bidirectional power conversion is powered off or when the power supply is unplugged while online, for example, upon receiving a power-off command or identifying a power-supply unplug signal, the series-parallel switching circuit for bidirectional power conversion performs following operations.

The gate drive signal for each of main power switching transistors Q1, Q2, Q3, Q4, Q5, Q6, Q7, and Q8, and the gate drive signal for each of main power switching transistors Q11, Q12, Q13, Q14, Q15, Q16, Q17, and Q18 are set to low, to stop power transfer.

After stopping power transfer and blocking waveform, the soft-start relay switch K5 is turned off, and the output voltage Vin is identified. When the output voltage of Vin drops to a safe voltage, the bleeder switching transistor Qx of the bleeder circuit is started, and the residual voltage across each of the internal output capacitor Cout, the upper-path output filter capacitor C1, and the lower-path output filter capacitor C2 is discharged to the safe voltage through the bleeder circuit. Therefore, the bleeder function is implemented.

Taking FIG. 2 as an example, the switching from the series operating mode to the parallel operating mode in a forward operating state is described. When the bidirectional power supply operates in the series operating mode, K5 is in an on state, and a voltage Vcout across the internal output capacitor Cout is consistent with a level of an external output voltage Vo. At this time, the series-parallel switching circuit for bidirectional power conversion is in the series operating state, K1 and K2 are in an on state, and K3 and K4 are in an off state. When the operating mode of the bidirectional power supply needs to be switched to the parallel operating mode, following operations are performed.

The gate drive signal for each of main power switching transistors Q1, Q2, Q3, Q4, Q5, Q6, Q7, and Q8, and the gate drive signal for each of main power switching transistors Q11, Q12, Q13, Q14, Q15, Q16, Q17, and Q18 are set to low, to stop power transfer.

The specific process is as follows.

After stopping power transfer and blocking waveform, a short freewheeling time t1 (t1 may be specifically designed as several or dozens of switching cycles) is delayed, and then K1 and K2 are turned off.

In this way, after stopping power transfer and blocking waveform, residual electric energy stored in the inductor L1 after blocking waveform may be removed according to the delayed short freewheeling time t1, so that for the circuit, the internal voltage and the external voltage maintain within a safe range.

After turning off K1 and K2, a turn-off operation of the relay is delayed for time t2 (t2 may be specifically designed as the maximum delay time of the turn-off operation of the relay), and K3 and K4 are turned on.

A turn-on operation of the relay is delayed for time t3 (t3 may be specifically designed as the maximum delay time of the turn-on operation of the relay), and then a pulse is emitted to the main power switching transistor, to implement a parallel power-transfer operating mode.

It may be noted that, the turn-off operation time t2 of the relay and the delay time t3 of the turn-on operation of the relay can take into account the delays associated with both turn-off and turn-on of the relay, thereby further eliminating an excessive voltage difference between the internal voltage and the external voltage during turn-off or turn-off of the relay.

Taking FIG. 2 as an example, the switching from the parallel operating mode to the series operating mode in the forward operating state is described. When the bidirectional power supply operates in the parallel operating mode, K5 is in an on state, a voltage Vcout across the internal output capacitor Cout is consistent with a level of an external output voltage Vo. At this time, the series-parallel switching circuit for bidirectional power conversion is in the parallel operating mode, K3 and K4 are in an on state, and K1 and K2 are in an off state. When the operating mode of the bidirectional power supply needs to be switched to the series operating mode, following operations are performed.

The gate drive signal for each of main power switching transistors Q1, Q2, Q3, Q4, Q5, Q6, Q7, and Q8, and the gate drive signal for each of main power switching transistors Q11, Q12, Q13, Q14, Q15, Q16, Q17, and Q18 are set to low, to stop power transfer.

The specific process is as follows.

After stopping power transfer and blocking waveform, a short freewheeling time t1 (t1 may be specifically designed as several or dozens of switching cycles) is delayed, and then K3 and K4 are turned off.

After turning off K3 and K4, a turn-off operation of the relay is delayed for time t2 (t2 may be specifically designed as the maximum delay time of the turn-off operation of the relay), and then K1 and K2 are turned on.

A turn-on operation of the relay is delayed for time t3 (t3 may be specifically designed as the maximum delay time of the turn-on operation of the relay), and then a pulse is emitted to the main power switching transistor, to implement a series power-transfer operating mode.

Further, when the bidirectional circuit is in a reverse operating mode, the logic for switching the operating mode of the bidirectional circuit in the reverse operating mode is the same as the logic for switching the operating mode of the bidirectional circuit in the forward operating mode. When the circuit is in a reverse power-up mode, the external voltage Vin also charges the internal output capacitor Cout, the upper-path output filter capacitor C1 and the lower-path output filter capacitor C2 in the circuit through the soft-up resistor Rs, thereby completing the pre-charge operation. When the bidirectional circuit is in the reverse operating mode, the logic for switching from the series operating mode to the parallel operating mode and switching from the parallel operating mode to the series operating mode is consistent with that in the forward operating mode.

In order to implement the technical solutions of the present disclosure and to facilitate understanding and application of the present disclosure by more engineering and technical personnel, specific embodiments with be provided to further explain how to implement the series-parallel switching circuit for bidirectional power conversion and the corresponding control method.

Figure 3B:
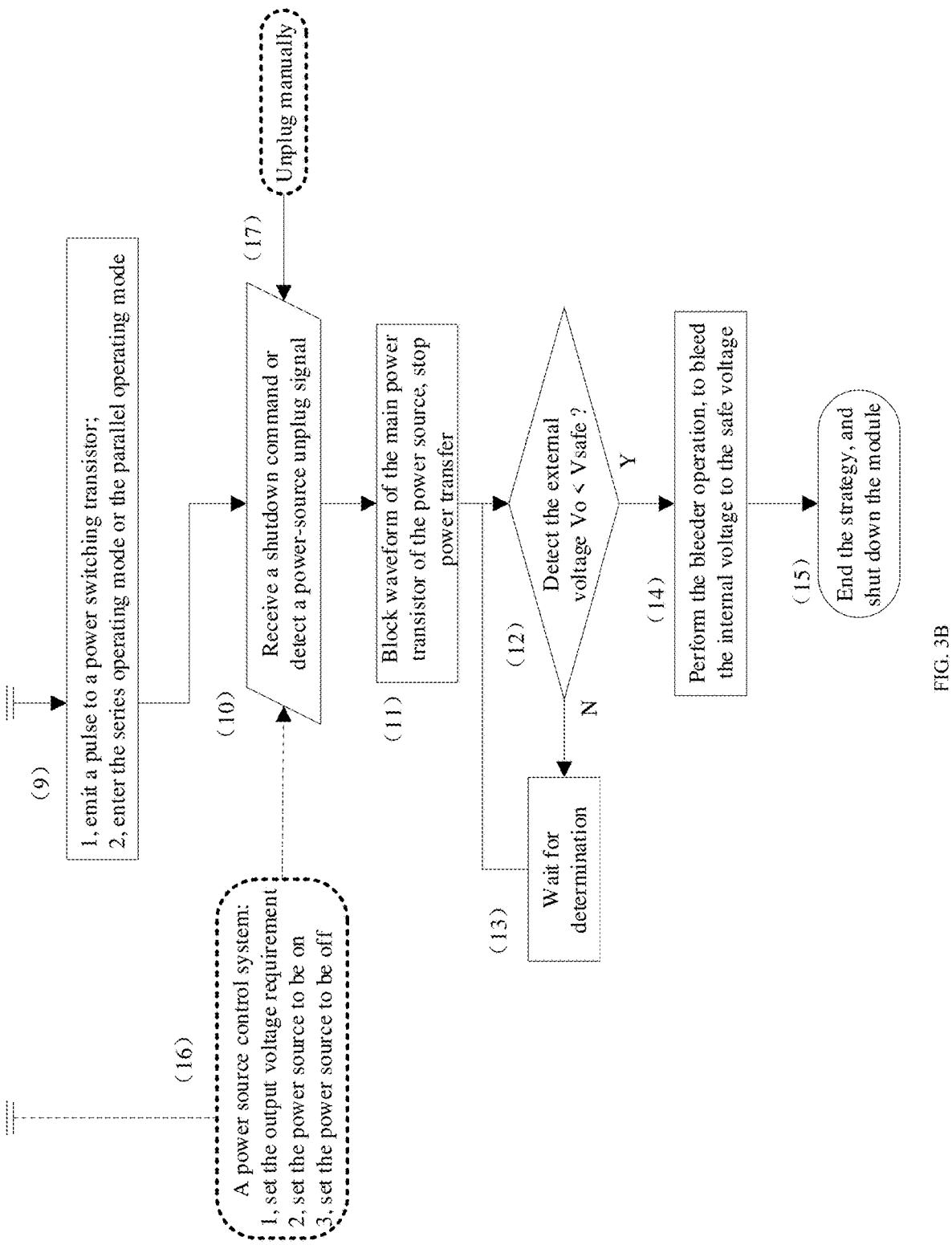

FIGS. 3A-3B show a schematic flowchart of a corresponding control method of a series-parallel switching circuit for bidirectional power conversion according to an embodiment of the present disclosure.

Specifically, the specific implementation manner of the control method of the present disclosure may be implemented based on a digital control chip of a bidirectional power supply module, through the detailed control flow illustrated in FIGS. 3A-3B.

(1) A bidirectional power supply module is powered up.

(2) An internal capacitor output voltage Vcout is pre-charged to an external voltage Vo through a soft-start diode Ds and soft-start resistor Rs.

(3) A power-on command and an output voltage setting value Vo_set from a power supply control system are received, a soft-start relay switch K5 is turned on, and a present operating range of the power supply module is Sq.

(4) By setting the voltage Vo_set, a series-parallel operating range Sw of a bidirectional power source is determined. When a required output voltage of the module falls within a high-voltage range, a series operating mode is entered, and Sw is set as 1. When the required output voltage of the module falls within a low-voltage range, a parallel operating mode is entered, and the SW is set as 0.

(5) A serial-parallel operating state is identified. When Sw is equal to Sq, the serial-parallel switching does not need to be performed. When Sw is not equal to Sq, the serial-parallel switching needs to be performed.

(6) When Sw=1, it needs to switch to the series operating mode; otherwise, when Sw=0, it needs to switch to the parallel operating mode.

(7) During switching to the series mode, switching from the parallel operating mode to the series operating mode is performed.

(8) During switching to the parallel mode, switching from the series operating mode to the parallel operating mode is performed.

(9) After the switching is completed, a pulse is emitted to a power switching transistor, and the series operating mode or the parallel operating mode is entered.

(10) A shutdown command is received, or a power-source unplug signal is detected.

(11) When the shutdown command is received or the power-supply unplug signal is detected, the pulse that is emitted to the power transistor is stopped, to stop output power transfer.

(12) to (13) Whether the external output voltage Vo drops below a safe voltage Vsafe, and if the external output voltage Vo does not drop below the safe voltage Vsafe, wait for determination.

(14) When it is detected that the external output voltage Vo is less than Vsafe, the bleeder operation is enabled to bleed the internal voltage to the safe voltage.

(15) The strategy is ended, and the module is shut down.

(16) is an operation of an external control of the power supply control system, including setting an output voltage requirement and setting on or off of the switch power supply, which is related to (3) and (10).

(17) is one of the operations of triggering (10). When a user manually unplugs the power supply, the digital control chip of the bidirectional power supply module can detect that the power supply is unplugged.

Figures 4, 5:
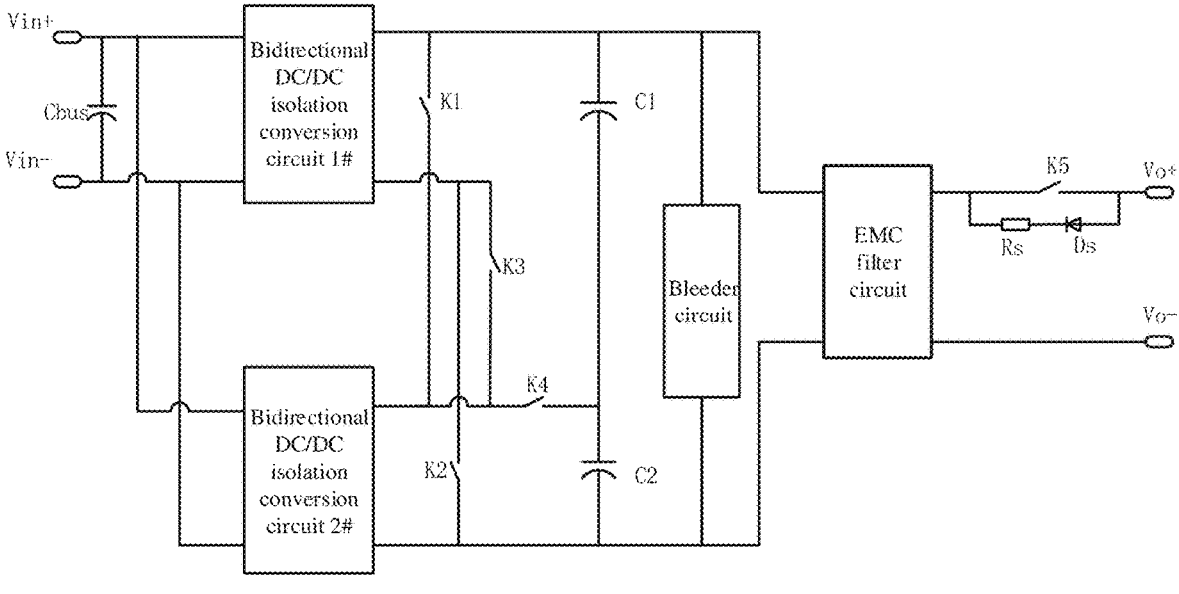
FIG. 4 is a schematic diagram of a series-parallel switching circuit for bidirectional power conversion according to another embodiment of the present disclosure.
FIG. 5 is a schematic diagram of a series-parallel switching circuit for bidirectional power conversion according to yet another embodiment of the present disclosure.

FIG. 4 is a schematic diagram of a series-parallel switching circuit for bidirectional power conversion according to another embodiment of the present disclosure.

FIG. 5 is a schematic diagram of a series-parallel switching circuit for bidirectional power conversion according to yet another embodiment of the present disclosure.

Further, the series-parallel switching circuit for bidirectional power conversion proposed in the present disclosure can be modified into circuits of two different connection forms, as illustrated in FIG. 4 and FIG. 5. It can be seen that in the circuits of the two connection forms, C1 and C2 can also be decoupled from K1, K2, K3, and K4, and a voltage across C1 and a voltage across C2 do not vary with the switching of the series-parallel switching switch. The circuits in FIG. 4 and FIG. 5 may also implement fast series-parallel switching of the bidirectional DC/DC isolation conversion circuit.

In the present disclosure, by providing two bidirectional DC/DC isolation conversion circuits and corresponding output filter capacitors, and by maintaining the voltage across each output filter capacitor of the two bidirectional DC/DC isolation conversion circuits unchanged in the series-parallel switching process, decoupling processing between serial-parallel switching of the two bidirectional DC/DC isolation conversion circuits and the corresponding output filter capacitors, the sticking risk of voltage difference switching across the soft-start relay is eliminated, and an electric energy bleeder function and a soft-start pre-charge function are supported in the series-parallel switching process of two bidirectional DC/DC isolation conversion circuits. The present disclosure can greatly reduce the time for series-parallel switching of the bidirectional DC/DC isolation conversion circuit, can implement a fast series-parallel switching function of the bidirectional DC/DC isolation conversion circuit, and can greatly improve the applicability of the bidirectional DC/DC isolation conversion circuit.

Further, the present disclosure further provides an operating-mode switching method for bidirectional power conversion. The series-parallel switching circuit for bidirectional power conversion in the above-mentioned embodiments is used to switch between the series operating mode and the parallel operating mode.

Further, the present disclosure further provides a switching power supply. The switching power supply includes the series-parallel switching circuit for bidirectional power conversion in the above-mentioned embodiments.

It may be understood that, all solutions and products implemented based on the above-mentioned series-parallel switching circuit for bidirectional power conversion shall fall within the scope of protection of the present disclosure.

It may be clearly understood by a person of ordinary skill in the art that, for convenient and brief description, division into the above-mentioned functional units and modules is merely used as an example for description. In actual application, the above-mentioned functions can be allocated to different functional units and modules for implementation according to requirements, that is, an inner structure of the apparatus is divided into different functional units or modules to implement all or some of the functions described above.

The foregoing embodiments are merely intended for describing the technical solutions of the present disclosure, but not for limiting the present disclosure. It should be understood by those of ordinary skill in the art that although the present disclosure has been described in detail with reference to the above-mentioned embodiments, modifications can be made to the technical solutions described in the above-mentioned embodiments, or equivalent replacements can be made to some technical features in the technical solutions; and these modifications or replacements will not cause the essence of corresponding technical solutions to depart from the spirit and scope of the technical solutions in the embodiments of the present disclosure, and should fall within the protection scope of the present disclosure.

What is claimed is:

1. A series-parallel switching circuit for bidirectional power conversion, comprising:

a first bidirectional direct current (DC) voltage source and a second bidirectional DC voltage source, that are configured to provide a DC voltage for bidirectional power conversion, wherein a direction from the first bidirectional DC voltage source to the second bidirectional DC voltage source is a forward power-transfer direction;

a first bidirectional DC/DC isolation conversion circuit and a second bidirectional DC/DC isolation conversion circuit, that are configured to implement a bidirectional DC/DC function;

a series-parallel switching switch configured to connect the first bidirectional DC/DC isolation conversion circuit and the second bidirectional DC/DC isolation conversion circuit in series or in parallel, to switch the series-parallel switching circuit for bidirectional power conversion to operate in a series operating mode or a parallel operating mode;

a first output filter capacitor and a second output filter capacitor, wherein the first output filter capacitor is an output filter capacitor of the first bidirectional DC/DC isolation conversion circuit, and the second output filter capacitor is an output filter capacitor of the second bidirectional DC/DC isolation conversion circuit, wherein when the series-parallel switching switch is switched, a voltage across the first output filter capacitor and a voltage across the second output filter capacitor are unchanged;

a bleeder circuit configured to discharge the first output filter capacitor and the second output filter capacitor when the series-parallel switching circuit is powered off; and a soft-start circuit comprising a soft-start relay switch and a soft-start resistor, wherein the soft-start circuit is configured for capacitive pre-charge of both the first output filter capacitor and the second output filter capacitor, to make a voltage difference between the first bidirectional DC voltage source or the second bidirectional DC voltage source and each of the first output filter capacitor and the second output filter capacitor within a preset range.

2. The series-parallel switching circuit for bidirectional power conversion of claim 1, wherein the series-parallel switching switch comprises a first switch, a second switch, a third switch, and a fourth switch; when the first switch and the second switch are turned on, and the third switch and the fourth switch are turned off, the series-parallel switching circuit for bidirectional power conversion is switched to the parallel operating mode; when the first switch and the second switch are turned off, and the third switch and the fourth switch are turned on, the series-parallel switching circuit for bidirectional power conversion is switched to the series operating mode; a path of the series-parallel switching switch does not contain the first output filter capacitor and/or the second output filter capacitor; and one end of the first output filter capacitor is connected to a positive electrode of each of the first bidirectional DC voltage source and the second bidirectional DC voltage source, one end of the second output filter capacitor is connected to a negative electrode of each of the first bidirectional DC voltage source and the second bidirectional DC voltage source, and another end of the first output filter capacitor is connected to another end of the second output filter capacitor.

3. The series-parallel switching circuit for bidirectional power conversion of claim 1, wherein when the series-parallel switching circuit for bidirectional power conversion is powered up in the forward power-transfer direction, the soft-start relay switch is turned off, and then the first bidirectional DC voltage source or the second bidirectional DC voltage source charges an internal voltage through the soft-start resistor, wherein the internal voltage comprises the voltage across the first output filter capacitor and the voltage across the second output filter capacitor, and when a voltage difference across the soft-start relay switch reaches a preset threshold, the soft-start relay switch is turned on to complete a pre-charge operation.

4. The series-parallel switching circuit for bidirectional power conversion of claim 3, wherein when the series-parallel switching circuit for bidirectional power conversion is powered off, the first bidirectional DC/DC isolation conversion circuit and the second bidirectional DC/DC isolation conversion circuit stop power transfer, and then the soft-start relay switch is turned off and an output voltage is obtained; and when the output voltage drops to a preset safe voltage range, the bleeder circuit is started to discharge the internal voltage to implement a bleeder function.

5. The series-parallel switching circuit for bidirectional power conversion of claim 2, wherein when the series-parallel switching circuit for bidirectional power conversion is switched from the series operating mode to the parallel operating mode, the first bidirectional DC/DC isolation conversion circuit and the second bidirectional DC/DC isolation conversion circuit stop power transfer, and then a delay operation is performed according to the parallel operating mode switched by the series-parallel switching switch; and after the delay operation ends, a power transfer function of the first bidirectional DC/DC isolation conversion circuit and the second bidirectional DC/DC isolation conversion circuit is started to complete switching of the parallel operating mode.

6. The series-parallel switching circuit for bidirectional power conversion of claim 5, wherein in terms of performing the delay operation according to the parallel operating mode switched by the series-parallel switching switch, a first time is delayed after the first bidirectional DC/DC isolation conversion circuit and the second bidirectional DC/DC isolation conversion circuit stop the power transfer, the first switch and the second switch are turned off and a second time is delayed after delaying the first time, the third switch and the fourth switch are turned on and a third time is delayed after delaying the second time, and after delaying the third time, the power transfer function of the first bidirectional DC/DC isolation conversion circuit and the second bidirectional DC/DC isolation conversion circuit is started to complete the switching of the parallel operating mode, wherein the first time is set according to a current freewheeling time, the second time is set according to a delay time of a turn-off operation of the soft-start relay switch, and the third time is set according to a delay time of a turn-on operation of the soft-start relay switch.

7. The series-parallel switching circuit for bidirectional power conversion of claim 2, wherein when the series-parallel switching circuit for bidirectional power conversion is switched from the parallel operating mode to the series operating mode, the first bidirectional DC/DC isolation conversion circuit and the second bidirectional DC/DC isolation conversion circuit stop power transfer, and then a delay operation is performed according to the series operating mode switched by the series-parallel switching switch; and after the delay operation ends, a power transfer function of the first bidirectional DC/DC isolation conversion circuit and the second bidirectional DC/DC isolation conversion circuit is started to complete switching of the series operating mode.

8. The series-parallel switching circuit for bidirectional power conversion of claim 7, wherein in terms of performing the delay operation according to the series operating mode switched by the series-parallel switching switch, a first time is delayed after the first bidirectional DC/DC isolation conversion circuit and the second bidirectional DC/DC isolation conversion circuit stop power transfer, the third switch and the fourth switch are turned off and a second time is delayed after delaying the first time, the first switch and the second switch are turned on and a third time is delayed after delaying the second time, and after delaying the third time, the power transfer function of the first bidirectional DC/DC isolation conversion circuit and the second bidirectional DC/DC isolation conversion circuit is started to complete the switching of the series operating mode, wherein the first time is set according to a current freewheeling time, the second time is set according to a delay time of a turn-off operation of the soft-start relay switch, and the third time is set according to a delay time of a turn-on operation of the soft-start relay switch.

9. An operating-mode switching method for bidirectional power conversion, wherein a series-parallel switching circuit for bidirectional power conversion is used to switch between a series operating mode and a parallel operating mode, wherein the series-parallel switching circuit for bidirectional power conversion comprises:

a first bidirectional direct current (DC) voltage source and a second bidirectional DC voltage source, that are configured to provide a DC voltage for bidirectional power conversion, wherein a direction from the first bidirectional DC voltage source to the second bidirectional DC voltage source is a forward power-transfer direction;

a first bidirectional DC/DC isolation conversion circuit and a second bidirectional DC/DC isolation conversion circuit, that are configured to implement a bidirectional DC/DC function;

a series-parallel switching switch configured to connect the first bidirectional DC/DC isolation conversion circuit and the second bidirectional DC/DC isolation conversion circuit in series or in parallel, to switch the series-parallel switching circuit for bidirectional power conversion to operate in the series operating mode or the parallel operating mode;

a first output filter capacitor and a second output filter capacitor, wherein the first output filter capacitor is an output filter capacitor of the first bidirectional DC/DC isolation conversion circuit, and the second output filter capacitor is an output filter capacitor of the second bidirectional DC/DC isolation conversion circuit, wherein when the series-parallel switching switch is switched, a voltage across the first output filter capacitor and a voltage across the second output filter capacitor are unchanged;

a bleeder circuit configured to discharge the first output filter capacitor and the second output filter capacitor when the series-parallel switching circuit is powered off; and a soft-start circuit comprising a soft-start relay switch and a soft-start resistor, wherein the soft-start circuit is configured for capacitive pre-charge of both the first output filter capacitor and the second output filter capacitor, to make a voltage difference between the first bidirectional DC voltage source or the second bidirectional DC voltage source and each of the first output filter capacitor and the second output filter capacitor within a preset range.

10. A switching power supply, comprising a series-parallel switching circuit for bidirectional power conversion, wherein the series-parallel switching circuit for bidirectional power conversion comprises:

a first bidirectional direct current (DC) voltage source and a second bidirectional DC voltage source, that are configured to provide a DC voltage for bidirectional power conversion, wherein a direction from the first bidirectional DC voltage source to the second bidirectional DC voltage source is a forward power-transfer direction;

a first bidirectional DC/DC isolation conversion circuit and a second bidirectional DC/DC isolation conversion circuit, that are configured to implement a bidirectional DC/DC function;

a series-parallel switching switch configured to connect the first bidirectional DC/DC isolation conversion circuit and the second bidirectional DC/DC isolation conversion circuit in series or in parallel, to switch the series-parallel switching circuit for bidirectional power conversion to operate in a series operating mode or a parallel operating mode;

a first output filter capacitor and a second output filter capacitor, wherein the first output filter capacitor is an output filter capacitor of the first bidirectional DC/DC isolation conversion circuit, and the second output filter capacitor is an output filter capacitor of the second bidirectional DC/DC isolation conversion circuit, wherein when the series-parallel switching switch is switched, a voltage across the first output filter capacitor and a voltage across the second output filter capacitor are unchanged;

a bleeder circuit configured to discharge the first output filter capacitor and the second output filter capacitor when the series-parallel switching circuit is powered off; and a soft-start circuit comprising a soft-start relay switch and a soft-start resistor, wherein the soft-start circuit is configured for capacitive pre-charge of both the first output filter capacitor and the second output filter capacitor, to make a voltage difference between the first bidirectional DC voltage source or the second bidirectional DC voltage source and each of the first output filter capacitor and the second output filter capacitor within a preset range.

11. The switching power supply of claim 10, wherein the series-parallel switching switch comprises a first switch, a second switch, a third switch, and a fourth switch; when the first switch and the second switch are turned on, and the third switch and the fourth switch are turned off, the series-parallel switching circuit for bidirectional power conversion is switched to the parallel operating mode; when the first switch and the second switch are turned off, and the third switch and the fourth switch are turned on, the series-parallel switching circuit for bidirectional power conversion is switched to the series operating mode; a path of the series-parallel switching switch does not contain the first output filter capacitor and/or the second output filter capacitor; and one end of the first output filter capacitor is connected to a positive electrode of each of the first bidirectional DC voltage source and the second bidirectional DC voltage source, one end of the second output filter capacitor is connected to a negative electrode of each of the first bidirectional DC voltage source and the second bidirectional DC voltage source, and another end of the first output filter capacitor is connected to another end of the second output filter capacitor.

12. The switching power supply of claim 10, wherein when the series-parallel switching circuit for bidirectional power conversion is powered up in the forward power-transfer direction, the soft-start relay switch is turned off, and then the first bidirectional DC voltage source or the second bidirectional DC voltage source charges an internal voltage through the soft-start resistor, wherein the internal voltage comprises the voltage across the first output filter capacitor and the voltage across the second output filter capacitor, and when a voltage difference across the soft-start relay switch reaches a preset threshold, the soft-start relay switch is turned on to complete a pre-charge operation.

13. The switching power supply of claim 12, wherein when the series-parallel switching circuit for bidirectional power conversion is powered off, the first bidirectional DC/DC isolation conversion circuit and the second bidirectional DC/DC isolation conversion circuit stop power transfer, and then the soft-start relay switch is turned off and an output voltage is obtained; and when the output voltage drops to a preset safe voltage range, the bleeder circuit is started to discharge the internal voltage to implement a bleeder function.

14. The switching power supply of claim 11, wherein when the series-parallel switching circuit for bidirectional power conversion is switched from the series operating mode to the parallel operating mode, the first bidirectional DC/DC isolation conversion circuit and the second bidirectional DC/DC isolation conversion circuit stop power transfer, and then a delay operation is performed according to the parallel operating mode switched by the series-parallel switching switch; and after the delay operation ends, a power transfer function of the first bidirectional DC/DC isolation conversion circuit and the second bidirectional DC/DC isolation conversion circuit is started to complete switching of the parallel operating mode.

15. The switching power supply of claim 14, wherein in terms of performing the delay operation according to the parallel operating mode switched by the series-parallel switching switch, a first time is delayed after the first bidirectional DC/DC isolation conversion circuit and the second bidirectional DC/DC isolation conversion circuit stop the power transfer, the first switch and the second switch are turned off and a second time is delayed after delaying the first time, the third switch and the fourth switch are turned on and a third time is delayed after delaying the second time, and after delaying the third time, the power transfer function of the first bidirectional DC/DC isolation conversion circuit and the second bidirectional DC/DC isolation conversion circuit is started to complete the switching of the parallel operating mode, wherein the first time is set according to a current freewheeling time, the second time is set according to a delay time of a turn-off operation of the soft-start relay switch, and the third time is set according to a delay time of a turn-on operation of the soft-start relay switch.

16. The switching power supply of claim 11, wherein when the series-parallel switching circuit for bidirectional power conversion is switched from the parallel operating mode to the series operating mode, the first bidirectional DC/DC isolation conversion circuit and the second bidirectional DC/DC isolation conversion circuit stop power transfer, and then a delay operation is performed according to the series operating mode switched by the series-parallel switching switch; and after the delay operation ends, a power transfer function of the first bidirectional DC/DC isolation conversion circuit and the second bidirectional DC/DC isolation conversion circuit is started to complete switching of the series operating mode.

17. The switching power supply of claim 16, wherein in terms of performing the delay operation according to the series operating mode switched by the series-parallel switching switch, a first time is delayed after the first bidirectional DC/DC isolation conversion circuit and the second bidirectional DC/DC isolation conversion circuit stop power transfer, the third switch and the fourth switch are turned off and a second time is delayed after delaying the first time, the first switch and the second switch are turned on and a third time is delayed after delaying the second time, and after delaying the third time, the power transfer function of the first bidirectional DC/DC isolation conversion circuit and the second bidirectional DC/DC isolation conversion circuit is started to complete the switching of the series operating mode, wherein the first time is set according to a current freewheeling time, the second time is set according to a delay time of a turn-off operation of the soft-start relay switch, and the third time is set according to a delay time of a turn-on operation of the soft-start relay switch.

* * * * *